United States Patent [19]

Vaughan

[11] Patent Number: 5,267,739
[45] Date of Patent: Dec. 7, 1993

[54] ENGINE COMPARTMENT SEAL

[75] Inventor: Robert A. Vaughan, Dearborn, Mich.

[73] Assignee: The Standard Products Company, Cleveland, Ohio

[21] Appl. No.: 762,884

[22] Filed: Sep. 19, 1991

Related U.S. Application Data

[63] Continuation of Ser. No. 476,573, Feb. 7, 1990, abandoned.

[51] Int. Cl.⁵ ............................ F16J 15/10; F06B 7/23
[52] U.S. Cl. .................................. 277/205; 277/181; 49/490.1
[58] Field of Search .................. 277/181, 182, 205; 49/490, 491; 180/89.17

[56] References Cited

U.S. PATENT DOCUMENTS

| 3,165,793 | 1/1965 | Lynch | 277/205 |
|---|---|---|---|
| 4,103,459 | 8/1978 | Barnerias et al. | 49/491 |
| 4,193,605 | 3/1980 | Josephson | 277/211 X |
| 4,448,430 | 5/1984 | Bright | 277/178 X |
| 4,495,234 | 1/1985 | Tominaga et al. | 49/490 X |
| 4,708,351 | 11/1987 | Midooka et al. | 277/205 X |
| 4,744,570 | 5/1988 | Kranz | 277/205 X |
| 4,848,035 | 7/1989 | Sakuma et al. | 49/491 |
| 4,884,370 | 12/1989 | Nozaki et al. | 49/490 X |
| 4,918,867 | 4/1990 | Hayashi et al. | 49/491 X |
| 4,926,600 | 5/1990 | Mesnel | 49/491 |
| 4,956,941 | 9/1990 | Vaughan | 49/490 X |
| 4,959,081 | 9/1990 | Mathellier | 49/490 |
| 4,970,102 | 11/1990 | Guillon | 49/490 X |
| 4,976,069 | 12/1990 | Arima et al. | 49/491 X |
| 5,072,546 | 12/1991 | Ogawa | 49/490 X |
| 5,123,693 | 6/1992 | Karashima et al. | 49/491 X |
| 5,168,668 | 12/1992 | Mishima et al. | 49/490 X |

FOREIGN PATENT DOCUMENTS

| 0329964 | 8/1989 | European Pat. Off. | 277/212 R |
|---|---|---|---|
| 0285433 | 11/1989 | Japan | 277/205 |
| 02-27329 | 9/1990 | Japan | 49/491 |
| 0336786 | 2/1989 | PCT Int'l Appl. | 277/205 |
| 1133906 | 11/1968 | United Kingdom . | |
| 1582557 | 1/1981 | United Kingdom . | |
| 2170281 | 7/1986 | United Kingdom . | |

OTHER PUBLICATIONS

Webster's New World Dictionary, Third College Edition, Simon & Schuster, New York, 1988, p. 16.

*Primary Examiner*—William A. Cuchlinski, Jr.
*Assistant Examiner*—James K. Folker
*Attorney, Agent, or Firm*—Harness, Dickey & Pierce

[57] ABSTRACT

An engine compartment cover seal strip has a retention mechanism, securing mechanism, bulb seal and lip flange seal. The retention mechanism maintains the seal strip onto the edge of an engine compartment cover. The securement mechanism retains a member, such as insulation, adjacent to the edge of the engine compartment cover. The bulb seal is adapted to sealingly engage with a surface on axis with the cover edge to reduce noise and prevent precipitation from entering into the vehicle passenger compartment. The flange seal is to sealingly contact a second surface laterally positioned with respect to the cover edge to reduce noise and prevent precipitation from entering the passenger compartment. The lip flange seal includes a pair of bulbs which prevent unwanted deformation when the seal encounters inside and outside radius situations. The retention member, securement member, bulb seal and flange seal are co-extruded with one another to form an elongated seal strip.

7 Claims, 3 Drawing Sheets

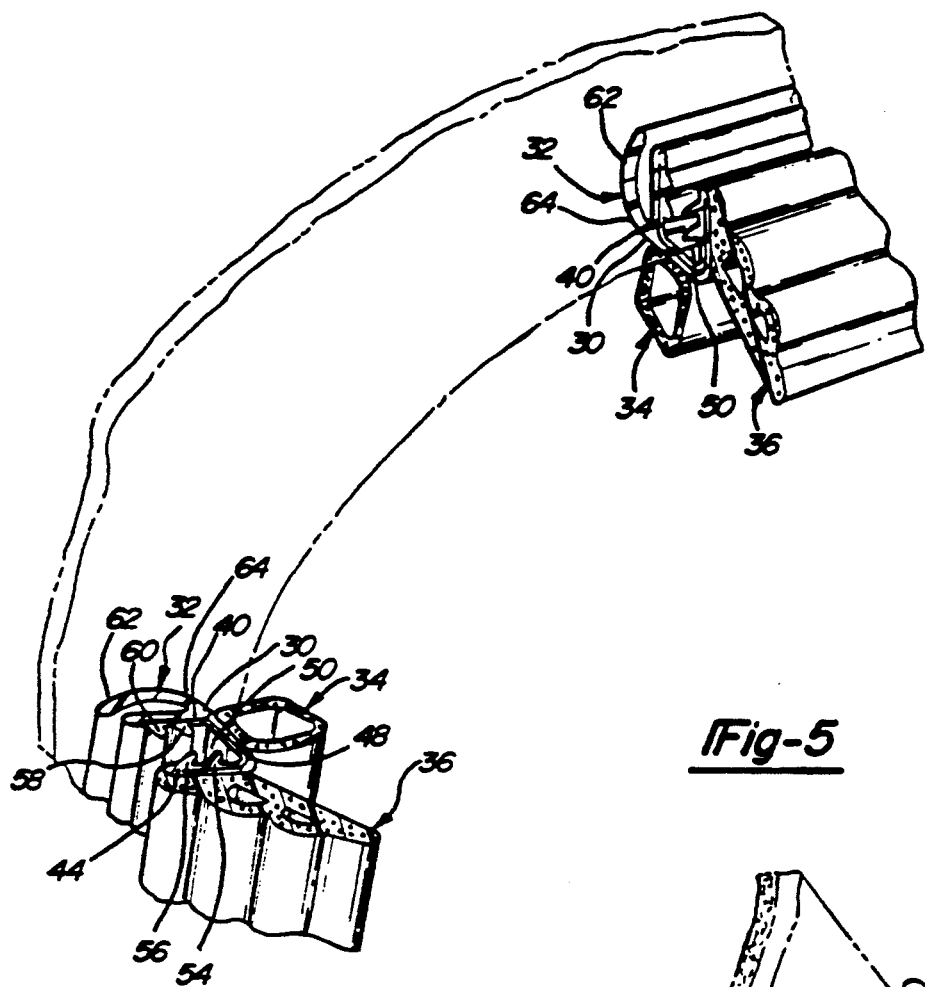
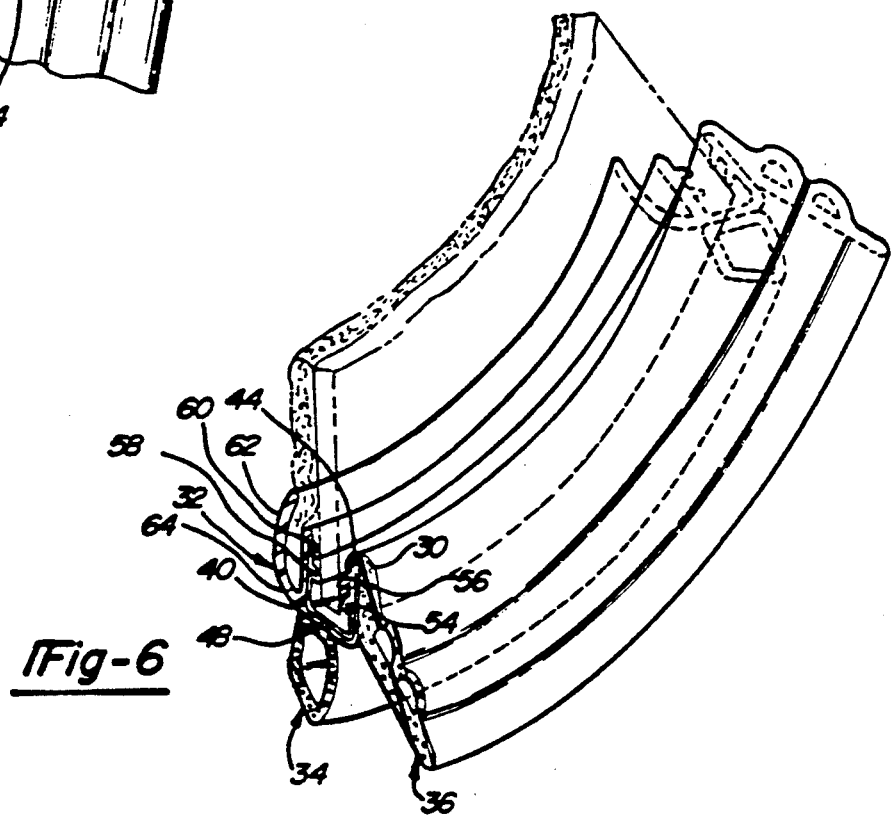

ENGINE COMPARTMENT SEAL

This is a continuation of Ser. No. 476,573, filed Feb. 7, 1990, now abandoned.

BACKGROUND AND SUMMARY OF THE INVENTION

The present invention relates to automotive seal strips and, more particularly, to automotive seal strips for engine compartment covers. The seal strips engage the edge of the cover to seal the cover with the vehicle passenger compartment.

In automotive vehicles having short front ends, such as trucks and vans, often times the vehicles are designed such that the engine extends into the passenger compartment of the vehicle. The engine is ordinarily covered with an engine compartment cover or the like to add a pleasing aesthetic appearance within the passenger compartment of the vehicle while providing a cover for the engine compartment.

It is desirable to have a seal strip on the engine compartment cover to seal the engine compartment cover with the vehicle floor, fire wall or dash to suppress noise and to eliminate elements such as wind, rain, snow or the like from entering into the vehicle passenger compartment. Due to the design of the vehicle, the covers have edges with varying curved contours. Generally, the edge contours have various inward and outward curves to provide a pleasing aesthetic appearance while covering the engine compartment. Also, the engine compartment cover attempts to provide the maximum allowable space within the vehicle passenger compartment. The curves in the edge contour requires a sealing member that can be manipulated around the edge contour to provide an adequate seal without rolling or becoming disengaged from the cover edge.

Accordingly, it is an object of the present invention to provide a seal strip which provides adequate sealing between the engine compartment cover and the vehicle. Also, the present invention provides the art with an aesthetically pleasing seal strip which is maintained on the edge of the engine compartment cover. The present invention provides the art with a seal member that follows the edge contour of the engine compartment cover without rolling, deforming or becoming detached from the edge of the cover, especially around radius situations.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 5 illustrates a perspective enlarged view partially in cross-section of a portion of the seal along an edge contour curved portion of the engine compartment cover at arrow A of FIG. 1.

FIG. 6 illustrates a perspective enlarged view partially in cross-section of a portion of the seal along an edge contour curved portion of the engine compartment cover at arrow B of FIG. 1.

DETAILED DESCRIPTION OF THE PREFERRED EMBODIMENT

Figure 1:
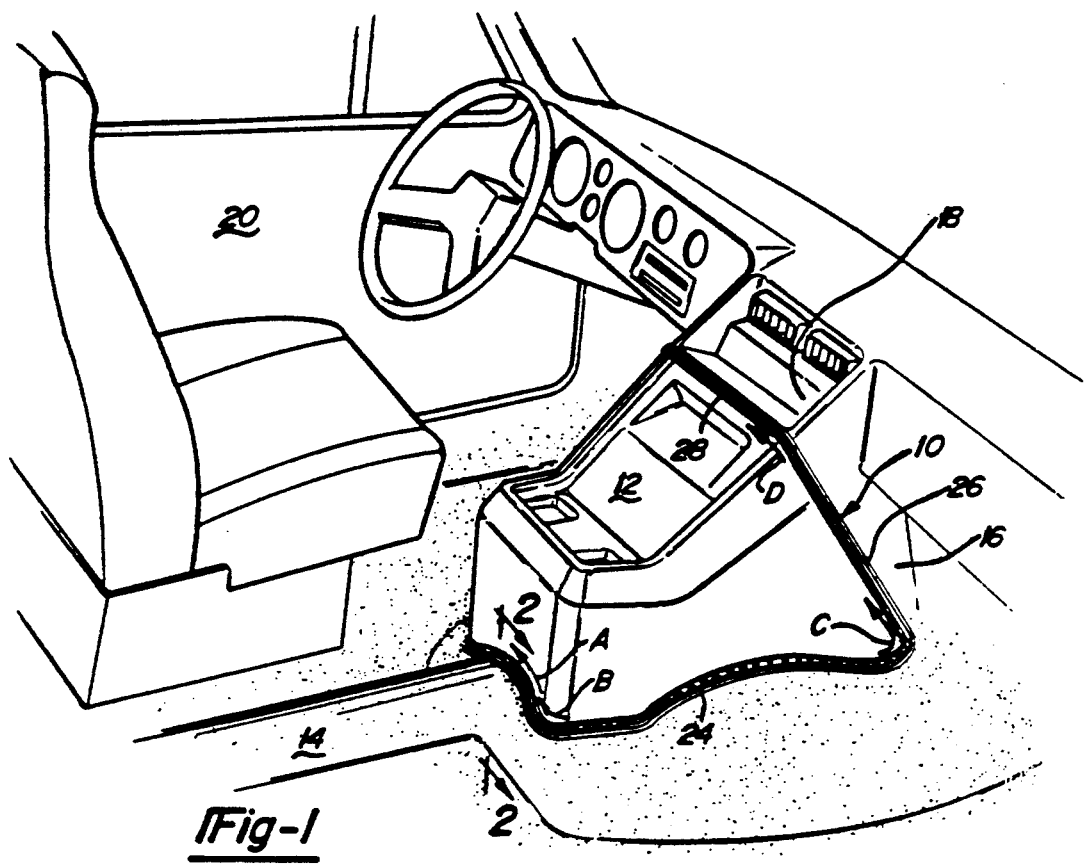
FIG. 1 illustrates a perspective view of an engine compartment cover within a vehicle passenger compartment with a seal in accordance with the present invention.
Figure 3:
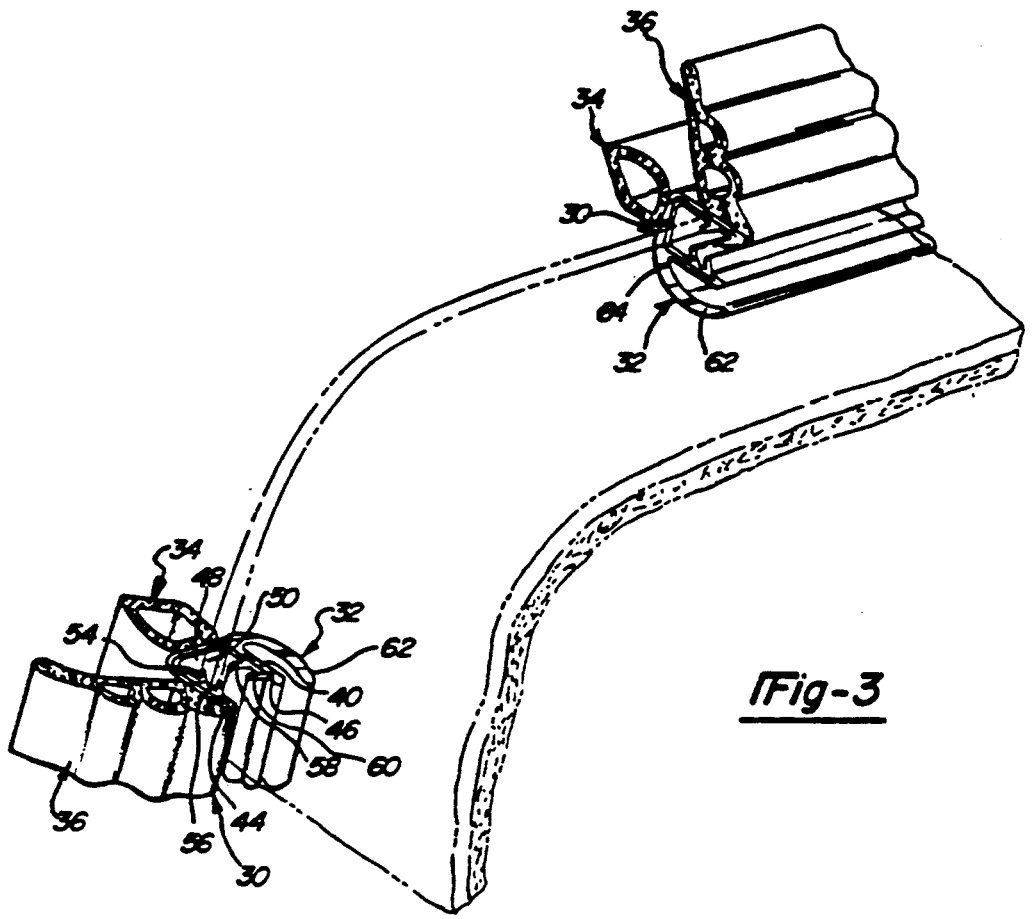
FIG. 3 illustrates a perspective enlarged view partially in cross-section of a portion of the seal along an edge contour curved portion of the engine compartment cover at arrow D of FIG. 1.
Figure 4:
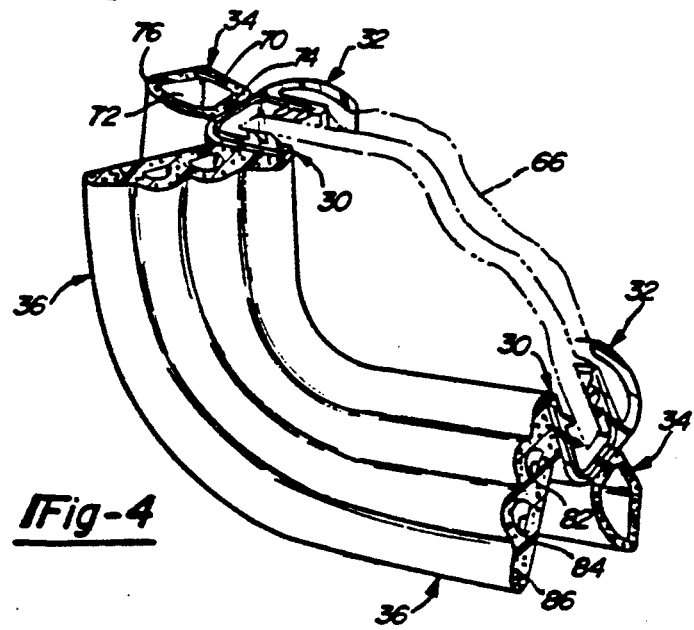
FIG. 4 illustrates a perspective enlarged view partially in cross-section of a portion of the seal along an edge contour curved portion of the engine compartment cover at arrow C of FIG. 1.

Referring to the figures, a vehicle engine compartment seal strip is illustrated and designated with the reference numeral 10. The engine compartment seal strip 10 is illustrated secured to an edge of an engine compartment cover 12. The engine compartment seal strip 10 is in sealing contact with floor 14, fire wall 16 and dash 18 at the bottom 24, sides 26 and top 28 of the engine compartment cover 12 within the passenger compartment 20. The engine compartment cover 12 has a perimeter edge 22 with several inward and outward arcuate portions as seen in FIGS. 1, 3 and 4. The engine compartment seal strip 10 is positioned about the perimeter of the engine compartment cover 12 on its contoured edge 22 and is joined end to end to form a closed unitary one-piece seal.

The engine compartment seal strip 10 is generally an elongated strip including a retention mechanism 30, a securement mechanism 32, a bulb seal 34 and a flange or lip seal 36. The retention mechanism 30, securement mechanism 32, bulb seal 34 and flange seal 36 run the longitudinal length of the strip 10. The strip 10 is formed as a unitary construction having the retention mechanism 30, securement mechanism 32, bulb seal 34 and flange seal 36 co-extruded with one another from desired elastomeric material such as rubber.

Figure 2:
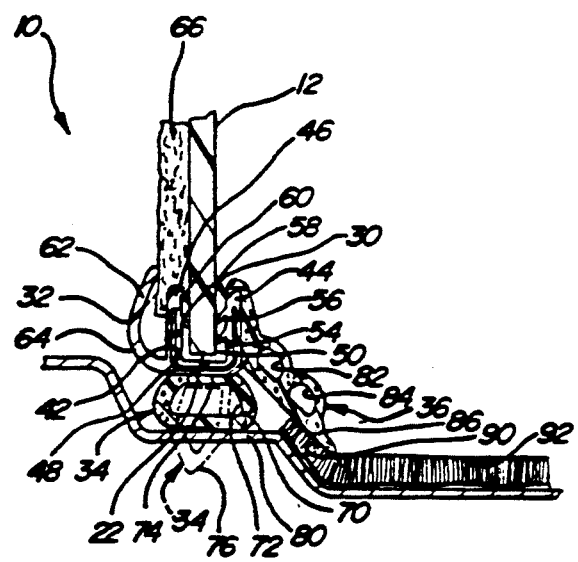
FIG. 2 is a cross-section view of FIG. 1 through a plane defined by the Line 2—2 thereof.

Referring to FIG. 2, a cross-section of the engine compartment seal strip 10 is shown. The seal strip 10 generally has an overall "W" shape in cross-section, one "U" formed by the retention mechanism 30 and the other "U" formed by the securement mechanism 32 with the bulb seal 34 and lip seal 36 projecting from the U-shaped retention mechanism 30.

The retention mechanism 30 includes a reinforcement member 40 covered with an integral elastomeric skin 42. The reinforcement member 40 is "U" shaped having a pair of legs 44 and 46 separated by and extending from a web portion 48 and all covered by skin 42. The legs 44 and 46 and web 48 define a channel 50 which is to be secured onto the contoured edge 22 of the engine compartment cover 12. The legs 44 and 46 include retaining fingers 54, 56, 58 and 60 extending therefrom into the channel 50. The fingers 54, 56, 58 and 60 are adapted to contact the edge 22 to retain the seal strip 10 thereon. The fingers 54, 56, 58 and 60 may be substituted with other known types of retaining mechanisms to retain the seal strip onto the cover edge 42.

Integrally formed with the elastomeric skin 42 is securement mechanism 32. The securement mechanism 32 has an overall "U" shape and shares leg 46 of the retention mechanism 30 to form its "U". Leg 62 and web 64 form the remainder of the "U" of securement mechanism 32. The leg 62 generally extends a distance further away from the web 64 than leg 46 to secure an insulation member 66 adjacent to the engine compartment cover edge 22. The insulation 66 is pinched between leg 62 and the cover 12 to retain the insulation 66 adjacent to the cover 12. Generally, the securement mechanism 32 is formed from the same elastomeric material as the integral skin 42 covering the retention mechanism 30. Ordinarily, the leg 62 and web 64 are about the same thickness as the legs 44 and 46 and web 48 of the retention mechanism 30, however, the leg 62 and web 64 lack the reinforcement member 40 thus enabling the leg 62 to be pulled away from the leg 46. The leg 62 resiliently moves back to its related position upon removal of the pulling force to pinch and secure the insulation 66 adjacent to the cover edge 22 as seen in FIG. 2.

The bulb seal 34 is of a tubular construction having an overall pentagonal house shape in cross-section in a relaxed position as seen in phantom in FIG. 2. A continuous five sided wall 70 defines a hollow tunnel 72. The bulb seal 34 is generally secured by a side 74 at the web 48 of the retention mechanism 30 such that the apex 76 of the bulb seal 34 extends away from web 48. Also, the apex 76 is substantially on a central axial plane dividing the channel 50 in half. The bulb seal side 74 generally spans the width of the web 48. As the bulb seal apex 76 contacts a surface 80, like the floor 14, fire wall 16 or dash 18 of the vehicle, the bulb seal 34 becomes compressed effecting a seal with the surface 80 as seen in FIG. 2. The bulb seal 34 is positioned on axis with respect to the cover edge 22 to seal surface 80. The bulb seal 34 is to provide a reduction in noise and to substantially eliminate precipitation or the like from entering into the passenger compartment of the vehicle from the engine compartment. Generally, the bulb seal 34 is extruded from a sponge elastomeric material and is coextruded with the other members of the seal strip 10 to form a unitary construction.

The lip flange 36 angularly extends from the leg 44 of the retention mechanism 30 and is laterally offset from the central plane dividing the channel in half. The lip flange 36 is generally extruded from a sponge elastomeric material and is co-extruded with the retention mechanism 30, securement mechanism and bulb seal 34 to form unitary seal strip 10. The lip flange 36 includes at least one tunnel, preferably two, forming a pair of bulbs 82 and 84 in the flange 36. A tail 86 extends from the bulbs 82 and 84. The tail 86 is adapted to contact a surface 90 of the vehicle floor 14, fire wall 16 or dash 18 to effect a seal as seen in FIG. 2. Bulbs 82 and 84 prevent unwanted deformation when the seal encounters inside and outside radius situations. Lip flange 36 is positioned to seal surface 90 which is laterally positioned off axis with respect to the cover edge 22. While this seal with a carpet 92 or the like of surface 90 provides a pleasing aesthetic appearance, it also provides a second seal to suppress noise and substantially prevent the possibility of precipitation or the like from entering into the vehicle passenger compartment from the engine compartment.

As can be seen in FIGS. 3, 4, 5 and 6, the seal strip 10 makes a variety of turns along the contoured edge 22 of the engine compartment cover 12. The reinforcement member 40 enables the seal strip 10 to bend so that the seal strip 10 remains in position as it traverses the contoured edge 22 of the engine compartment cover 12. Likewise, the retention mechanism 30 secures the seal strip 10 onto the edge 22 of the engine compartment cover 12 to prevent the seal from rolling or becoming disengaged from the edge 22. Further, bulb seal 34 and lip flange 36 contacts against the fire wall 16 and dash 18 to provide a seal, to reduce noise and prevent precipitation from entering the vehicle compartment from the engine compartment.

While the above detailed description describes the preferred embodiment of the present invention, it will be understood that the present invention is susceptible to modification, variation and alteration without varying from the scope and spirit of the subjoined claims.

I claim:

1. An engine compartment cover seal strip comprising:
    means for retaining the seal strip on an edge of a cover, said retaining means having an overall U-shape with a pair of upwardly extending leg portions separated by a web portion;
    means for securing a member adjacent the edge, said securing means integrally formed with said retaining means;
    bulb means for sealing contact with a surface, said bulb means integrally formed with and extending from said web portion of said retaining means; and
    lip means for sealing contact with a second surface below the web portion, said lip means integrally formed with and extending from one of said leg portions of said retaining means such that said bulb means and lip means are adjacent one another and extend in a substantially similar direction from said retaining means so that at least a portion of said bulb means and lip means are positioned below said web portion of each said retaining means.

2. The engine compartment cover seal according to claim 1 wherein said lip means being a flange extending from said retaining means for contacting the second surface.

3. The engine compartment seal according to claim 1 wherein said retaining means, securing means, bulb means and lip means form a unitary seal strip.

4. An engine compartment cover seal comprising:
    an elongated strip having retention means for retaining the strip to an edge, securement means for securing a member adjacent to the edge, said securement means integrally formed with said retention means, said retention means and securement means having an overall "W" shape in cross section with upwardly extending leg portions separated by web portions;
    bulb means for sealing contact with a surface to effect a seal between said elongated strip and the surface, said bulb means extending from said retention means; and
    seal means for sealing contact with a second surface to effect a seal between said elongated strip and the second surface below the web portion, said seal means extending from said retention means such that said bulb means and seal means are adjacent one another and extend in a substantial similar direction from said retaining means so that at leas a portion of each said bulb means and seal means are positioned below said web portion of said retaining means.

5. The engine compartment seal according to claim 4 wherein in cross-section, said bulb means extends from a web of said W-shaped retention means and securement means.

6. The engine compartment seal according to claim 4 wherein in cross-section, said seal means extends from a leg of said W-shaped retention means and securement means.

7. The engine compartment seal according to claim 4 wherein said seal means is comprised of a lip seal having at least one bulb member.

* * * * *